United States Patent [19]

Wong

[11] 4,079,366
[45] Mar. 14, 1978

[54] ELECTRONIC TIMER AND THERMOSWITCH DEVICE

[76] Inventor: Gim Wong, 1849 Gibbs Road, Estevan, Canada

[21] Appl. No.: 688,401

[22] Filed: May 20, 1976

[51] Int. Cl.² ............................................. H01H 43/00
[52] U.S. Cl. ................................ 340/309.4; 340/309.1; 340/409
[58] Field of Search ............................. 340/309.4, 409; 235/92 T, 151.1; 307/141

[56] References Cited

U.S. PATENT DOCUMENTS

| | | | |
|---|---|---|---|
| 3,790,815 | 2/1974 | Karklys | 340/309.4 |
| 3,798,424 | 3/1974 | Freitas | 235/92 T |
| 3,903,515 | 9/1975 | Haydon | 340/309.4 |

*Primary Examiner*—Harold I. Pitts
*Attorney, Agent, or Firm*—Stanley G. Ade

[57] ABSTRACT

An electronic programmable clock timer permits a program of times to be set so that certain electrical functions either AC or DC, can be operated responsive to the times set. A high and low range temperature selector can be set to turn ON or OFF thus operating certain electrical functions such as heating, cooling, lights, etc. When in the selected operating time range, means are provided to eliminate operation of the device on certain days or within certain time periods. Extensive use is made of I.C. circuitry, including memory circuits, comparator circuits and the like.

11 Claims, 4 Drawing Figures

ELECTRONIC TIMER AND THERMOSWITCH DEVICE

BACKGROUND OF THE INVENTION

This invention relates to new and useful improvements in thermostats and temperature control devices and systems.

The conventional temperature control devices normally utilize one temperature control selector which can be set to a predetermined temperature setting in order to turn attached equipment on and off at one selected temperature range.

As an example, a furnace thermostat will control the operation of the thermostat between upper and lower limits only and no means are provided to control ancilliary equipment such as lights or to control the thermostat by means of timing devices.

Conventional thermostats do not include a clock or timer to actuate the thermostat control circuit at selected or pre-determined times and conventional temperature control devices normally can only control AC power operated equipment.

Another disadvantage of previously used temperature control devices is that they cannot be used to replace a conventional thermostatic control without modification to the control which, of course, adds to the cost and difficulty in installing one temperature control device for an existing thermostat. Furthermore, conventional temperature control devices are provided with a relatively small temperature differential control, usually 2° F. to 3° F.

SUMMARY OF THE INVENTION

The present device can replace a conventional thermostat merely by connecting the conventional thermostat wiring to the device at the output terminals normally provided and one of the important improvements is the fact that two or more sets of output contacts can be provided so that, for example, cooling equipment can be connected to one and heating equipment connected to the other.

A further object of the invention is to provide a device in which the output switch circuit employs a relay or contactors to control or switch such electrical equipment or heating or cooling systems either ON or OFF by means of closed or open contacts when the magnetic coil associated therewith is energized or deenergized within the output circuit thus allowing the switch action to be operated in order to turn ON or OFF any electrically operated equipment which may be connected thereto regardless of whether this equipment is AC or DC.

Further, it is readily adaptable for controlling and operating as many electrically operated devices as required simply by increasing the contact arrangement of the relay or contactor within the output rather than adding more complex circuits as is normal.

Another object of the invention is to provide a device of the character herewithin described which provides two separate temperature range controls, namely a high range temperature selector and a low range temperature selector which can be set to turn ON or OFF thus operating heating systems or cooling systems at two separate temperature range selections and for different time periods if desired.

One of the important objects of the present invention is to provide an electronic clock timer which can be programmed to operate or select either one of the two separate range temperature range selectors in order to turn ON or OFF, heating or cooling systems connected thereto at any desired time and at the desired temperature range setting. Furthermore, the device can be set to operate at any intervals throughout a 24 hour period and can be set not to operate on a certain day or days in a 7 day period.

The electronic programmable clock timer is an improvement over the mechanical timer illustrated and described in my U.S. Pat. No. 3,740,564, dated June 19th, 1973, inasmuch as the present electronic clock timer eliminates all mechanical time setting pins, all gears, micro switches, motors and the like. By contrast, the present device utilizes solid state circuitry which gives improved timing accuracy, improved reliability, lower current operating characteristics and more importantly, gives a much simpler operation in order to set the times to actuate the various functions controlled by the device.

This is accomplished by pressing the time setting keyboard provided to set the ON time at any intervals and to set the OFF time duration down to a second, if desired, whereas mechanical timers utilizing setting pins usually are provided with only 15 minute increments due to the mechanical difficulty in providing smaller increments.

All of the functions may be operated by simple switches on the face of the instrument as will hereinafter be described and can be programmed to suit the individual circumstances under which the device is being used.

As mentioned previously, the device is provided with at least two sets of relay contacts in the output circuit, one set being used to select the high range temperature selector switch to turn ON the connected equipment at one pre-determined time setting and to select the other low range temperature selector switch to turn OFF the equipment at a further pre-determined time setting.

The other set of relay contacts may be used to control or turn ON or OFF other electrical equipment or appliances such as lighting systems utilized in the building at the same time settings. Although the present description refers to heating and cooling devices and lighting systems, these are examples only as any form of electrical equipment can be controlled by this device as may be desired.

A further object of the device is that it not only displays the time electronically, but also can display the memory location or the times it has been set, utilizing the same display devices as are used for the time display.

As an example, the first and second time digits may be called upon to display the memory location, that it the times the device has been set in a 24 hour period, the third time digit may indicate the number of the key switch that has been actuated and the last digit can display the day location in the 7 day cycle. This lets the operator see exactly what has been programmed into the memory circuit to operate the connected equipment thus eliminating the majority of errors and providing maximum reliability.

A colon (:) in the display unit between the hours and minutes of the time display flashes continuously so that the operator may readily check the electronic clock and see that it is functioning. In the present device, the frequency of flashing is 1 Hz.

Furthermore, means are provided so that the electronic clock timer can be reset or erased readily and easily and re-programming undertaken immediately.

Although it is preferable that the device operate from a conventional power source, nevertheless it can be adapted to operate with battery power because of the low current consumed by the solid state circuitry and, of course, such solid state circuitry is adapted to operate within a wide range of ambient temperatures.

Another object of the invention is to provide a device of the character herewithin described which includes a relatively large temperature differential such as from 1° C. to 10° C. and in which the differential can be adjusted by means of an hysteresis or temperature level control in order to prevent short duration cycling from occurring.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Proceeding therefore to describe the invention in detail, reference should be made to FIG. 1 in which 20 illustrates a casing or enclosure having one embodiment of a front display panel 21 upon which the various controls and the like are mounted as will hereinafter be described.

Figure 2:
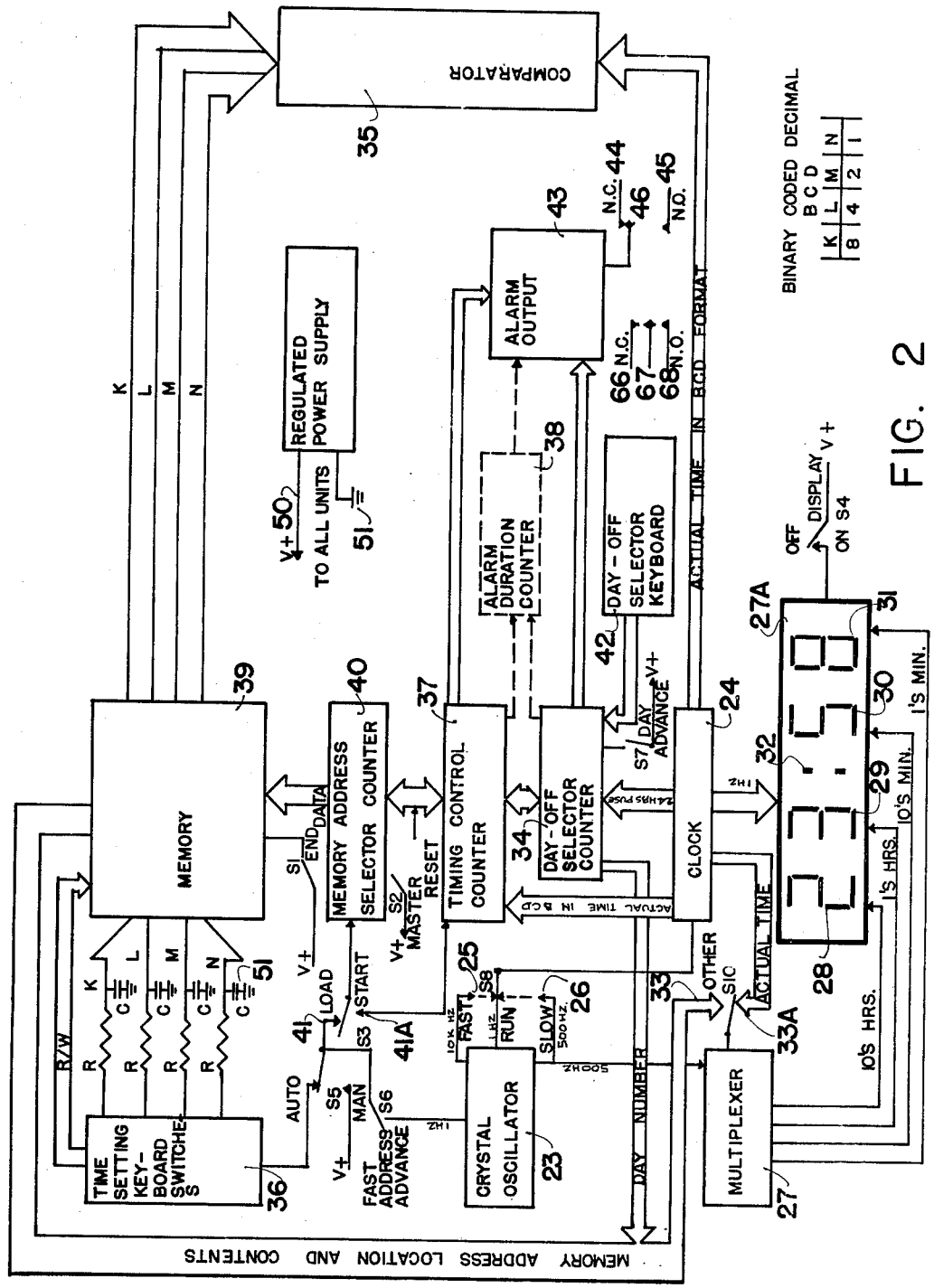
FIG. 2 is a block diagram of the device.

FIG. 2 shows a block diagram for the electronic clock timer which includes a crystal oscillator circuit 23 which in turn includes a plurality of binary counters (not illustrated) which divide the crystal oscillator frequency down to various frequencies. As an example, frequencies of 1 Hz (one cycle per second) 10 KHz (10,000 cycles per second) and 500 Hz (500 cycles per second) may be provided. Inasmuch as the internal circuitry of such oscillators and binary counters is well known, it is not believed necessary to give details of the construction thereof.

The 10 KHz frequency signal from the oscillator circuit 23 is utilized to operate a clock 24 fast, through a three-way switch S8 in position 25 while the 500 Hz signal is used to operate the clock slow, when the switch is in position 26. The high and low frequencies are used to set the clock to the correct time. Furthermore, the 500 Hz signal is also used for a display multiplexer 27.

When switch 28 is in the central position shown in FIG. 2, the 1 Hz signal frequency is used to operate the clock circuitry within clock 24 which is conventional. This frequency is further divided down within the clock circuitry to one pulse per minute (1/60 Hz), one pulse per hour (1/3600 Hz), and one pulse per 24 hours (1/3600 × 24 Hz).

The output information from the clock circuitry within clock 24 is BCD (Binary Coded Decimal) and one path of the BCD information from the clock 24 is fed to the multiplexer circuits 27 as illustrated. The 2 bit counter within the multiplexer circuit 27 drives the multiplexer circuit which passes each one of the group of 4 BCD words selected in succession at a rate of 500/4 equals 125 Hz. The 4 bits or words then feed to the display circuits 27A and these are decoded by decoder counters within the display circuits 27A which of course are conventional, to a 7 segment display unit thus displaying the actual time through LEDs or other similar display devices. Digit 28 shows 10's of hours, digit 29 shows unit hours, digit 30 shows 10's of minutes and digit 31 shows unit minutes. The colon 32 is flashed at 1 Hz to indicate readily that the clock is operating.

The display can also show the memory location or memory address on digits 28 and 29, the memory contents on 30, and the day in the 7 day cycle can be displayed on the last digit 31. This operation is undertaken by a display switch S10 being moved to "other" at position 33 from "actual time" position 33A in FIG. 2.

The 1/3600 × 24 Hz (24 hour pulse) is fed to the Day-Off circuit 34 taking the form of a selector counter, which takes 7-24 hour pulses to complete the 7 day cycle.

The other BCD outputs from the clock circuit 24 (the actual time in BCD format) are fed to comparator circuits 35 and are used to compare the time set in the memory circuit by the keyboard switches 36 (see FIG. 1) to the actual time, the timing control counter circuits 37, and the operation or signal duration (alarm) counter circuits 38 (the off time setting), all of which are shown schematically in FIG. 2.

Figure 1:
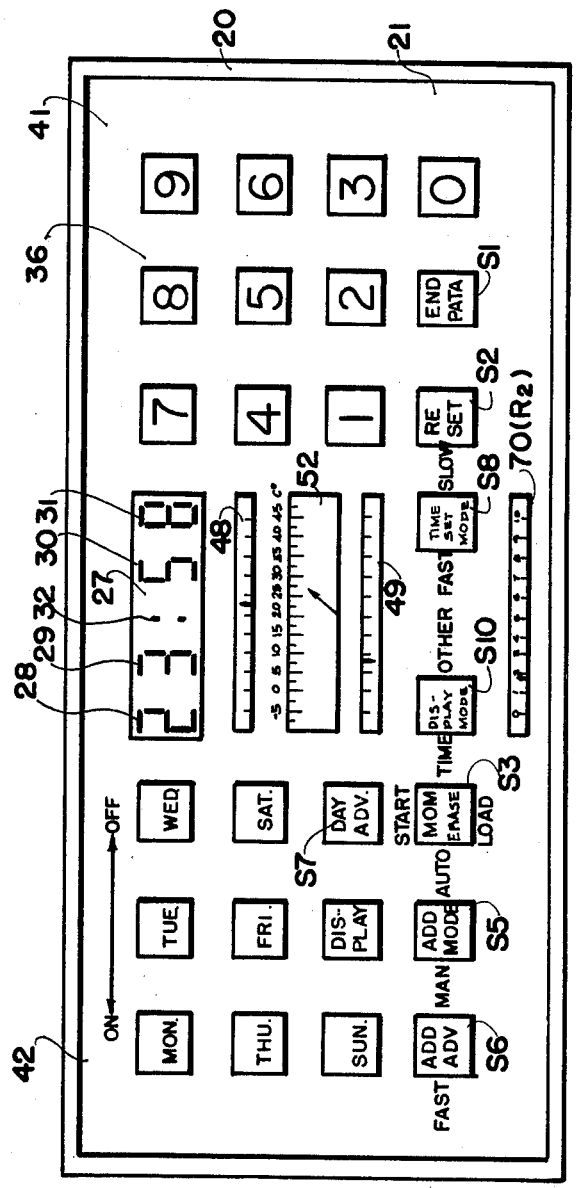
FIG. 1 is a front elevation of the front of the device.

The time selector keyboard 36 consists of 10 momentary operated switches shown in FIG. 1 and having indicia thereon which, in the present embodiment, consists of the numerals 0, 1, 2, 3, 4, 5, 6, 7, 8, 9 as illustrated.

The output of the time selector or setting keyboard 36 is converted to Binary Coded Decimal format (BCD) by the gate circuits within the time setting keyboard 36, to feed a memory circuit 39 on lines K, L, M, N and given below is an example of the Binary Coded Decimal format which may be utilized.

| Keyboard Switch | Binary Coded Decimal (BCD) | | | |
|---|---|---|---|---|
| | 8 K | 4 L | 2 M | 1 N |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

0=Low
1=High

Within the lines K, L, M, N which extend between the time setting keyboard 36 and the memory 39, is a combination of resistances R and capacitors C on each line thus introducing a slight time delay (the RC time constant) which is used to prevent faulty information from entering the memory circuit if, by chance, the keyboard switches are operated incorrectly or bounced.

When any key switch 36 is pressed or an End Data switch S1 is closed, two signals are generated, the R/W (read/write) signal which goes low to enable data to be read into the memory circuit, and the count command signal for the address select counter circuit 40 (when the data is programmed in Automatic Address Advance mode with S5, S3 in the position as shown in FIG. 2).

A memory location is selected by the 8 bit Binary counter used as an address select counter within the address select counter (dual 4 bit Binary counter) circuit 40. Since each alarm or signal setting requires 8-4 bit words (4 bit for ON time setting, and 4 bit for OFF time signal duration setting), the information entered is as follows (see example below):

Starting time of the alarm or start time (ON time) is indicated by two digits for the hours and two digits for the minutes which equals 4 BCD words or 4 memory locations. Secondly, the alarm or operation duration (OFF time) requires either two digits for hours and two digits for minutes for a long time duration or alternatively, two digits for minutes and two digits for seconds for a short time duration if required, either of which equals a four BCD word.

The number of alarm or signal time settings (ON time and OFF time) therefore is equal to the number of 4 bit words divided by 8, available. For example, if RAM I.C. (Random Access Memory Integrated Circuits) with 256-4 bit words are used for memory circuit 39, the number of time settings is equal to $256 \div 8 = 32$ and therefore the maximum number of selectable alarm or signal time setting sequences will be 31, one sequence being reserved for the "end data" setting. Thus 8 addresses are required for each ON and OFF time setting as follows:

| "ON" TIME (start time) | | | | "OFF" TIME (finished time) | | | |
|---|---|---|---|---|---|---|---|
| 10's Hrs. | 1's Hrs. | 10's Min. | 1's Min. | 10's Hrs. | 1's Hrs. | 10's Min. | 1's Min. |
| 0 | 0 | 0 | 0 | 0 | 0 | 0 | 0 |
| 4 bits | | | | 4 bits | | | |
| + = 8 bit BCD | | | | | | | |
| EXAMPLE Alarm or signal Setting | | | | | | | |
| Program Sequence | | ON Time | | OFF Time | | | |
| 1 | | 07.30 | | 07.52 | | | |
| 2 | | 11.48 | | 12.03 | | | |
| 3 | | 13.12 | | 13.45 | | | |
| 4 | | 15.43 | | 16.00 | | | |
| 5 | | | | | | | |
| 6 | | | | | | | |
| ↓ | | | | | | | |
| 20 | | 19.05 | | 19.23 | | | |
| 21 | | 19.45 | | 20.10 | | | |
| ↓ | | | | | | | |
| 31 | | 23.37 | | 23.59 | | | |

The above mentioned number of time settings is used as an example only as the number of selectable alarm or signal time setting sequences is dependent on the size of the RAM I.C. circuits and the number of 8 bit binary counters used for the address selector counter 40 which of course should match the RAM I.C. used in the memory circuits.

As an example, if a 1024-4 bit word RAM I.C. is used for memory circuit 39, the maximum number of selectable signal type setting sequences will be 1024/8 = 128. By the same token, if a 4096-4 bit word RAM I.C. is used, then the number of time setting sequences available will be 4096/8 = 512 time setting sequences.

The address selector counter used with a RAM memory circuit of 1024-4 bit words would be $2^{10}$ or 10 bit binary counter = 1024. In the case of a 4096-4 bit word RAM memory circuit, the address selector counter will be increased to $2^{12}$ or a 12 bit binary counter which provides 4096 addresses to be selected.

A memory location is selected by the 8 bit binary address (dual 4 bit binary counter) counter within the address selector counter circuit 40 and assuming that the address selector counter 40 is set to 0, a load switch S3A is switched to position 41 as shown in FIG. 2.

There are two ways to enter data within the circuits, namely Automatic Advance and Manual Advance. If switch S5 is in the "auto" position, the address advance pulse appears automatically each time a digit on the keyboard 36 has been pressed or operated, but if an error is made by operating the wrong keyboard switch, then the address selector counter must be reset to 0 state to erase all of the previous data entered whereupon the programming is started again from the beginning.

If switch S5 is switched to the "manual" position, and switch S3 is in the position as shown in FIG. 2, then when any keyboard switch is pressed on the time setting keyboard 36, the R/W line goes low (0) near ground potential thus allowing the information to be entered into the memory circuit 39 with a slight time delay due to the RC time constant introduced by the resistors R and capacitors C within the input lines K, L, M, N, and the BCD equivalent of the number pressed on the time setting keyboard switch 36 appears as "data" in lines K, L, M, N and is read into the first memory location.

In this regard reference is made to the previously described conversion from the switches to BCD output by lines K, L, M and N. As an example, when keyboard switch bearing the indicia 5 is pressed lines L and N are "high" or near positive potential. When switch marked "9" is operated, the output from lines K and N are both high or near positive potential thus transmitting the necessary signal to memory circuit 39. This is accomplished by the gating circuits in the time setting keyboard 36 and is of course conventional.

When the key switch 36 is lifted or released, the R/W line goes high (1) (near to V+ potential) thus locking the information in the memory location and the data disappears from the lines K, L, M, N, shortly after the manual advance switch S5 is pressed, thus advancing the address select counter by 1 increment.

After all the data has been read in the memory, the "end data" switch S1 is pressed which first causes the R/W line to go low (0) for "write" and then enters data 1111 into the memory thus signifying that there is no more data to be read in, because the "end data" switch S1 has entered the word 1111 into lines K, L, M, N, which is not a valid BCD character.

After the R/W line has gone high (1) again, 1111 data appears at the "data out" terminals of the memory circuit 39 (due to the gating circuit in the time setting keyboard 36) and resets the address select counter 40 to 0 state.

Manual Advance has an advantage over the Automatic Advance in that when an incorrect switch in keyboard switch 36 is actuated, the error may be corrected immediately without having to erase all of the previous data entered into the memory circuits. The correction is simply located by operating or actuating the fast advance switch S6 until the incorrect memory location re-appears whereupon the correct data is re-entered as will hereinafter be described. After all of the data or information has been programmed or entered, the end data switch S1 is pressed and S8 switched to "run" position. The load and start switch S3 is then switched to "start" thus automatically programming all of the data entered, into the memory circuit 39 and this repeats the program daily until the data in the memory circuit 39 is erased or reset. Needless to say, new data can be re-programmed into the memory circuit 39 in a similar way.

Figure 4:
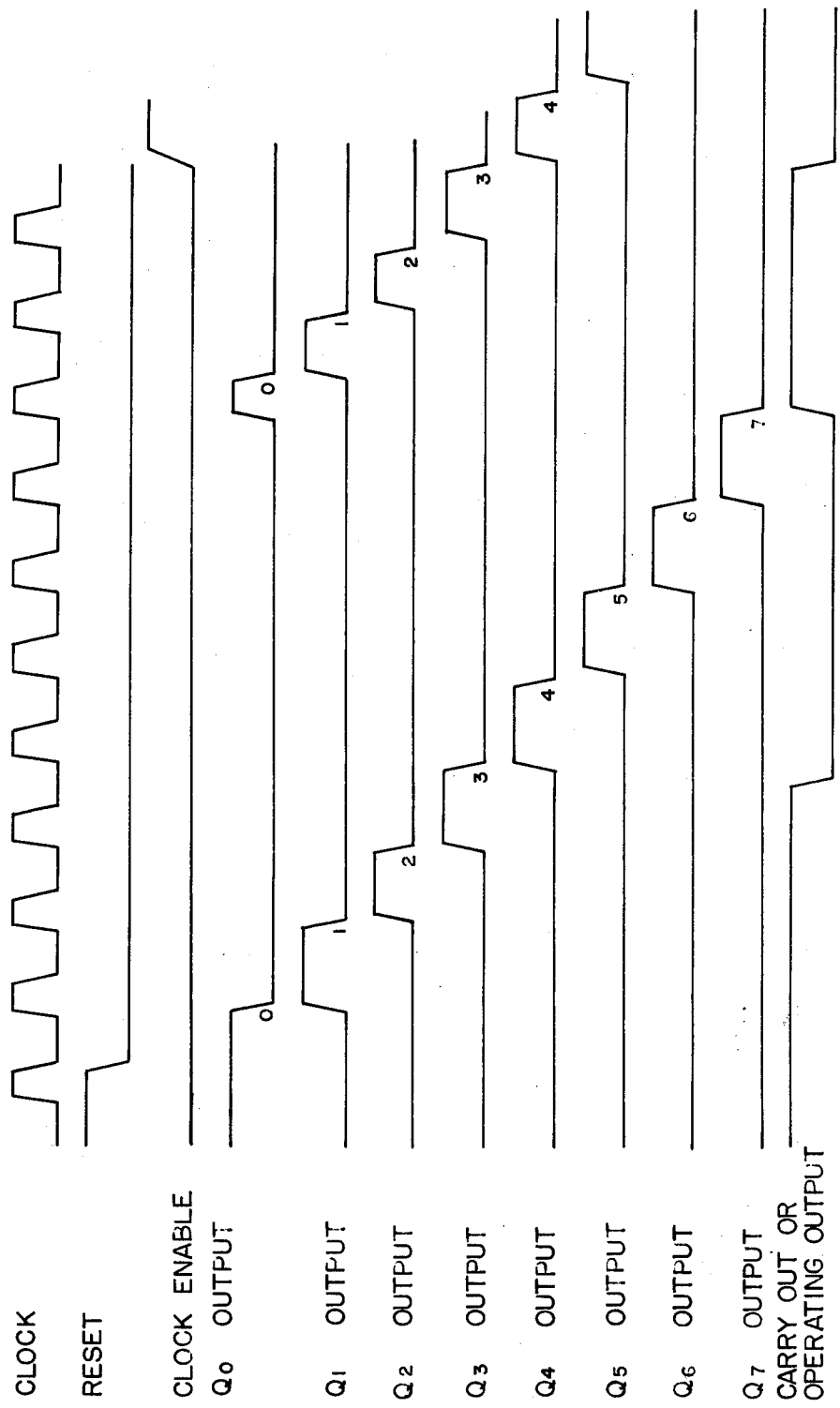
FIG. 4 is a wave form diagram of the output of the Johnson Counter for one sequence of commands.

The timing control circuit 37 consists of:

1. A four stage Johnson octal counter with a built-in code converter (not illustrated). The eight decoded outputs are normally low, and go high only at their appropriate octal time period. The output changes occur on the positive-going edge of the clock pulse and also have carry out output. The waveforms of this Johnson Counter is shown in FIG. 4.

2. Tri-state buffers integrated circuits (not illustrated). Its outputs are activated by a low (o) to the tri-state disable input.

3. Quad-2 inputs NOR gates Integrated circuits (not illustrated).

The operation and function of the timing control circuit is as follows:

The actual time in Binary Coded Decimal (BCD) format (the tens of hours, units of hours, tens of minutes, units of minutes) from the clock circuit 24 output is fed to the input of the tri-state buffers. The tens of hours of the tri-state buffers output which is activated by the high (1) from the QO output of the Johnson Counter via a NOR gate, produces a low (0) to the tri-state disable input, so that the tens of hours data appears on the tri-state output which is fed to one input of the comparator circuit 35.

The output of the memory 39 (tens of hours of the first ON time) is fed to the other input of the comparator circuit 35 and compared with the tens of hours from the clock via the tristate output. When the clock tens of hours becomes equal to the memory contents of the first memory location, the comparator 35 generates a high (1). This advances both the memory address selector counter 40 and the Johnson counter by one. At this point the Q1 output of the Johnson counter is high (1) and all the other outputs are low (0), therefore the unit hours are compared with the memory contents of the second memory location. When the unit hours become equal to the actual time of the clock through the tri-state buffers output, the comparator 35 generates a high (1) which advances both the memory address selector counter 40 and the Johnson counter by one again. Next the tens of minutes, and the unit minutes are compared in a similar fashion, and after four ON comparisons (tens of hours, unit hours, tens of minutes, unit minutes) are equal to the actual time from the clock through the tri-state buffers output circuits, the Johnson counter will produce a high (1) on its Q4 output while the carry out or operating output will go low, as shown in FIG. 4.

This biases the output transistors to a conducting state, thus energizing the relay or conductor within the alarm output 43, to start the first ON time, which closes the normally open contacts 67, 68, 45, 46 and opens the normally closed contacts 66, 67, 46, 44.

The four OFF time comparisons (tens of hours, unit hours, tens of minutes, unit minutes) for the long OFF time setting (or the tens of minutes, unit minutes, tens of seconds, unit seconds) for the short OFF time duration, are made to determine the first OFF time in the similar fashion as the ON time comparison. When the four OFF time comparisons agree or are equal to the actual time, then the carry out or operating output of the Johnson counter will go high. This will cut off the bias to the output transistors in the alarm output circuit 43 which will deenergize the relay and close the normally closed contacts 66, 67, 44, 46 and open the normally open contacts 67, 68, 45, 46 as shown in FIG. 2. The Johnson counter Q0 output is high at this time, so that the circuit is ready for the next ON time comparison again. The operation will repeat as above.

When it is desired to program for the short OFF time duration setting by using additional circuits as indicated by the dotted lines in FIG. 2, at the alarm duration counter circuit 38 it can be programmed as shown in the following example.

| Program Sequence | ON Time | | | | OFF Time Duration | | | |
|---|---|---|---|---|---|---|---|---|
| | 10's Hrs | 1's Hrs. | 10's Min. | 1's Min. | 10's Min. | 1's Min. | 10's Sec. | 1's Sec. |
| 1 | 0 | 7 | 3 | 0 | 2 | 2 | 1 | 2 |
| 2 | 1 | 1 | 4 | 8 | 1 | 5 | 0 | 4 |
| 3 | 1 | 3 | 1 | 2 | 3 | 3 | 4 | 6 |
| ↓ | | | | | | | | |
| 31 | 2 | 3 | 0 | 0 | 5 | 9 | 5 | 9 |

The data is entered to the memory circuit 39 in a similar way as the long OFF time setting in the above example. The 10's of hours from clock are compared with the memory content (K, L, M, N) in the memory location 00, and when they coincide, the comparator circuit 35 produces a (1) which advances the address selector counter circuit 40 by (1), and the Johnson counter within the timing control circuits 37 also by (1). Next, the unit hours are compared, then the 10's of minutes are next compared, and finally the units of minutes are compared with the memory location 03, in the similar way and when these coincide, the carry out or operating output of the Johnson counter goes low which resets the timer circuit within the alarm duration counter circuit 38 to zero and also feeds a 1 Hz pulse to start the timer circuit 38 via the NOR gates within the timing control counter circuit 37, depending upon the position setting of the day OFF counter selector switches in 42.

When an alarm signal is generated, i.e. when the carryout or operating output of the Johnson counter goes low, the alarm duration counter within 38, and the output circuit 43 are turned ON thus energizing the relay circuit within the alarm output circuit 43. This opens the normally closed contacts 44 and 46, and closes the normally open contacts 46, 45 and at the same time starts the alarm duration. When the 10's of minutes of the timer 38 are compared with the contents of the memory location 04, and they are equal, both the address selector counter and the Johnson counter are advanced by (1), next, the unit of minutes are compared, then the 10's of seconds are compared, and finally the unit seconds are compared with the memory location 07 and when the unit of seconds are equal to the contents of the memory location 07, the carry out or operating output of the Johnson counter goes high (1) which is similar to the long OFF time duration operation. This stops the alarm duration counter time 38 and when the carry out or operating output of the Johnson counter goes high (1) this will also de-energize the relay within the alarm output circuit 43, which opens the normally open contacts and closes the normally closed contacts as in the previous example. The Johnson counter within the timing control circuit 37 will start over again and be ready for the next sequence comparison.

As an example, refer to the previously described time setting 07:35 which is the ON time programmed into the memory. When the actual time on the clock reaches 07:35 as indicated in the display 27, this signal connected to BCD is fed to the comparator circuit 35. This compares the actual time signal with the relevant memory content and because they are now the same, the relay is energized in the output circuit 43. This relay remains energized until the actual time on the clock reaches 17:20 (indicated on the display 27). When this time is reached, the comparator compares this time with the OFF time programmed into the memory 39, and de-energizes the relay in the output circuit 43. The Johnson counter within the timing control counter 37 operates and shifts to the next output ready for the next time setting sequence programmed into the memory 39.

When the last program sequence has been executed, the next memory location containing 1111 data is entered thus resetting the address selector counter circuit 40 and the Johnson counter within the timing control counter circuits 37 to zero state and starts over again and the system is ready to compare the next time setting sequence in the same way.

The Day-Off counter circuit 34 consists of a seven stage binary or ripple counter, one for each day of the week, and the Day-Off selection is accomplished by counting the days with the seven stage ripple counter within the Day-Off counter circuitry 34. A 24 hour pulse received from the clock circuits 24 advances the day counter by (1) every 24 hours which can be programmed as follows by the 7-24 hour pulse to complete the 7 day cycle.

| Monday | Tuesday | Wednesday | Thursday | Friday | Saturday | Sunday |
|--------|---------|-----------|----------|--------|----------|--------|
| 001    | 010     | 011       | 100      | 101    | 110      | 111    |
| 1      | 2       | 3         | 4        | 5      | 6        | 7      |

The programmed alarm sequence may be disabled for any combination of a day or days in a 7 day cycle by means of closing the switch in the day selector switches 42 on the Day-Off selector keyboard as shown in FIG. 1. This shorts out the selected data input in the selector counter within the Day-Off selector counter circuits 34 thus eliminating the operation of the timer in any day or days of the week.

Figure 3:
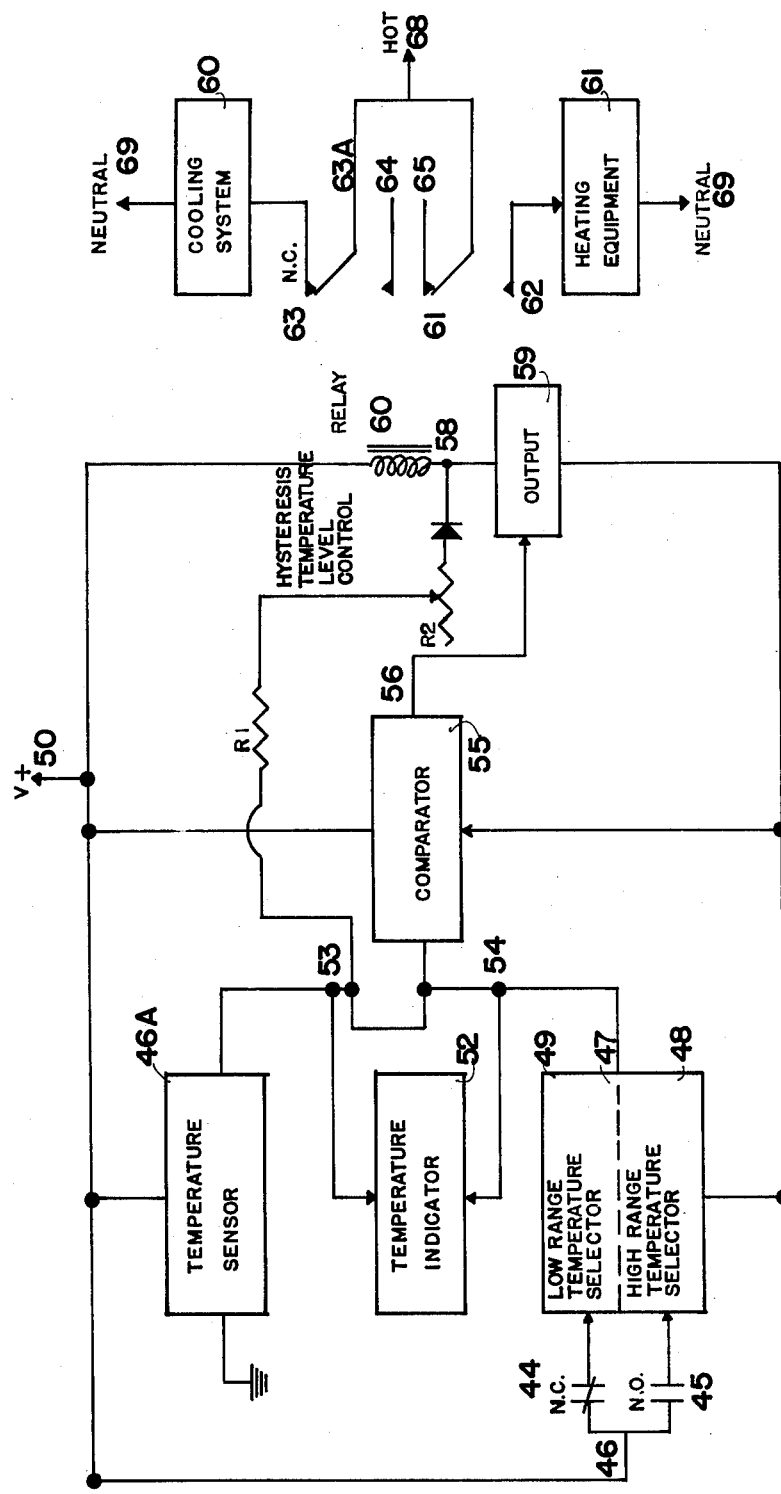
FIG. 3 is a block diagram for the electronic thermoswitch per se.

Reference to FIG. 3 shows a block diagram of the electronic thermoswitch or thermostat unit in which a thermistor or other similar temperature transducer or temperature sensor device is used as the temperature sensing element. The resistance value within the thermistor varies inversely with the temperature so that an increase in the ambient temperature will decrease the resistance value of the thermistor and a decrease in the ambient temperature will increase the resistance value within the thermistor.

The thermistors and resistors, which are conventional, within the temperature sensor circuit 46A, form one leg of a bridge. A range temperature selector circuit 47 includes resistors and two linear potentiometers, one for the high range temperature selector 48 and the other for the low range temperature selector 49 (see FIG. 1). These, together with the relay contacts 46, 44 and 45 from the output circuit 43 of the electronic clock timer, form the other leg of the bridge. There are two paths to allow the current flow from V+50 through these relay contacts and the temperature selector circuits 47. One path is from the V+50 to junction 46 and through normally closed contacts 44, the resistors within the circuits and the low range temperatures selector 49, to the negative terminal 51. The other path is from V+50 to 46 and the normally opened contacts 45 (this is providing that the relay from the electronic timer is energized and has closed the normally open contacts 45 and 46 and opened the normally closed contacts 44 and 46), through the resistors within the circuit 47 and the high range temperature selector 48 to 51. However, only one path at a time is possible to allow the current to flow through the relay contacts to complete the bridge circuit with the temperature sensor circuit 46A and this of course depends upon the position of the relay contacts 46, 44 and 45.

Assuming the relay contact is in the position as shown in FIG. 3, a temperature indicator 52 (see FIGS. 1 and 3) is connected between the junction 53 and the junction 54. If the ambient temperature changes, the resistance in the thermistor or the temperature sensor is changed and the current flow through the temperature indicator 52 changes in proportion to the temperature change. Because the temperature indicator 52 is calibrated in degrees of temperature and thus it will monitor the temperature in degrees.

The voltage across the low range temperature selector 49 at the junction 54 forms one leg of the bridge, and the voltage across the thermistor (or other temperature sensor) at the junction 53 which is proportional to the ambient temperature, forms the other leg of the bridge and both feed to a comparator circuit 55 which is used to compare both input signal voltages.

When the ambient temperature drops below the temperature set or selected on the low range temperature selector 49, the output of the comparator circuit goes high at the output 56 and biases an output transistor circuit 59, to a conducting state thus energizing relay system 60 and closing normally open contacts 61 and 62 to turn ON electrical equipment such as heating equipment connected thereto (not illustrated). At the same time it opens normally closed contacts 63 and 63A to turn OFF electrical equipment connected thereto, for example, the cooling system (not illustrated).

When the relay 60 is energized, point 58 goes low but a small amount of current is allowed to flow through an hysteresis or temperature level control R2, R1 and D1, which is a feed back circuit to control the temperature differential from for example 1° C to 10° C. Conventional thermostats include a mechanical adjustment normally operating within a relatively small range such as 3° F., and this means that equipment controlled thereby, cycles ON and OFF to a degree not desirable.

The hysteresis or temperature level control includes a trimmer potentiometer R2 and various resistors in the form of a conventional circuit, which lowers the voltage slightly at the input of the comparator circuit 55, depending upon the value of the resistors and the position of the variable potentiometer R2. This means that the ambient temperature has to vary through a greater range before the relay 60 is de-energized. For example, if the differential is set to 2° C. then if the ambient temperature rises to 2° C above the preset high temperature range, the input of the comparator circuit is in balance so that there will be no output pulse from the comparator circuit 56 and the relay in the output circuit 59 will de-energize thus opening the normally open contacts 66 and 62 to turn off the heating system, and closing the normally closed contacts 63 and 63A to turn on the cooling system.

When the ambient temperature drops down to the temperature set on the low range 49 of the temperature selector 47, the relay will again be energized reversing the positions of the contacts, and maintaining the relay in the energized condition until the ambient temperature once again rises 2° C. above the setting of the high range selector 48.

OPERATION

As an example of the operation of the device, assume that the device is connected to a heating system in a building and it is desirous that this heating system operate on the following sequence.
1. From 07.35 hours to 17.20 hours heating system ON at 23° C and OFF at 25° C.
2. From 17.20 hours to 20.21 hours, heating system ON at 10° C and OFF at 12° C.
3. From 20.21 hours to 22.58 hours, the heating system ON at 23° C. and OFF at 25° C.
4. From 22.58 hours to 07.35 hours, the next morning, the heating system ON at 10° C. and OFF at 12° C.

The above sequence to operate every day from Monday through Friday, except Saturday and Sunday.

To program the above operation, reference should first be made to the drawings in which the operator sets the thermoswitch on the front panel (FIG. 1) with the low range temperature seletor 49 to 10° C. and the high range temperature selector 48 to 23° C. The hysteresis control (or temperature level control) 70 is set for 2° C in this example.

The electronic timer is then programmed to set the time by punching the time setting keyboard switches 36 located on the top right side of FIG. 1, to the time desired. In the above example only two different time setting sequences are required to operate the heating system.

Referring to FIG. 2, the electronic clock timer block diagram, the operator first has to switch the address advance switch S5 to "auto" position and the load/start switch S3 to load position as illustrated in FIG. 2. These switches are mounted on the panel 21 in FIG. 1.

The first time sequence 07.35 hours to 17.20 hours is injected by pressing the momentary switch keyboard switches 07351720. The second time setting sequence 20.21 to 22.58 is then injected by pressing the key switches 20212258. The END DATA switch S1 is then actuated thus signifying to the memory circuit 39 that there are no more data to be entered and the time setting program is now completed.

The load/start switch S3 is then switched to the start position and then the Saturday and Sunday switches 42 are moved to the OFF position (switches closed) with the remaining day switches 42 being left in the ON position (switches open) thus eliminating the electronic timer operation on Saturday and Sunday regardless of the time set on the time setting keyboard switches 36. The programming procedure of the electronic timer and the thermoswitch is now completed.

Assuming at Monday morning at 07.35 hours, the comparator switch 35 within the electronic timer has compared the actual time on the electronic clock and compared the 10's of hours (0), the unit hours (7), the 10's of minutes (3), and the unit minutes (5) which are all equal to each other. Therefore, at this time the electronic timer alarm output circuit 43 will energize the relay and open its normally closed contacts 44, 46 and 66, 67 and close its normally open contacts 46, 45 and 67, 68. Assuming at this time that the temperature in the building has dropped below 23° C., the resistance value within the thermistor or temperature sensor 46A increases due to the decrease in temperature. Therefore, the voltage at junction 53 is increased which then becomes greater than the voltage at junction 54 and unbalances the bridge circuit. The output of the comparator circuit 55 goes high biassing the output transistor to a conducting state which in turn energizes the relay 60 within the output circuit 59 and opens the normally closed contacts 63, 63A and 65, 61 and closes the normally open contacts 63A, 64 and 61, 62 thus turning the heating system ON. When the temperature in the building reaches 25° C., the resistance within the thermistor is decreased and the voltage across the junction 53 also decreases at this point which balances the bridge circuit so that the voltage at junction 54 is equal to the voltage at junction 53. When a transistor in the output circuit 59 is conducting at point 58, goes low, a small current flows to the input of the comparator 55 via D1, R2 and R1, which will hold the relay 60 energized until the ambient temperature reaches substantially above 25° C. Therefore, the output of the comparator 55 goes low which cuts off the bias to the transistor circuit in the output circuit 59, and therefore the relay is de-energized so that the normally closed contats 63, 63A and 65, 66 close, and its normally opened contacts 64, 63A and 62, 66 open thus turning off the heating system.

The operation of the thermoswitch circuit repeats when the temperature in the building drops below 23° C.

At 17.20 hours, the comparator circuit 35 in the electronic timer compares the OFF time in the memory location with the actual time and when the 10's of hours (1), the units of hours (7), the 10's of minutes (2) and the units of minutes (0) are all compared and are all equal, the output of timing control counter 37 or signal which de-energizes the relay in the alarm output circuit 43 thus closing the normally closed contacts 46, 44 and 66, 67 and opening the normally closed contacts 67, 68 and 46, 45 as shown in FIGS. 2 and 3.

At this time, current flows through the normally closed contacts 46, 44 and through the low range temperatures selector 49 instead of through the high range temperature selector 48 so that the thermoswitch circuit now operates on the low range temperature selector from 10° C to 12° C. at this time, to turn the heating system ON when the temperature in the building drops slightly below 10° C. and turns the heating system OFF when the temperature in the building reaches slightly above 12° C. The operation repeats as hereinbefore described.

At 20.21 hours, the relay in the electronic timer alarm output circuit 43 is energized again, thus opening the normally closed contacts 67, 66 and 46, 44 and closing the normally open contacts 67, 68 and 46, 45. This switches the temperature range selector from low range temperature selector to the high range temperature selector 48, and therefore the thermoswitch circuit will turn ON the heating system when the temperature in the building is slightly below 23° C. and turns OFF the heating system when the temperature in the building reaches slightly above 25° C. during this time period. This is due to the hysteresis effect in the comparator 55.

At 20.58 hours, the electronic timer alarm output circuit 43 is de-energized once again and switches the contacts as shown in FIGS. 2 and 3. This switches the thermoswitch back to the low range temperature selector 59 as shown in FIG. 3 to operate the heating system between 10° C. and 12° C. until 07.35 hours the next morning at which time the electronic timer alarm output relay switches the contacts again to close its normally open contacts and open its normally closed contacts.

The operation of the electronic timer and the thermoswitch circuits is repeated daily from Monday through Friday. On Saturday and Sunday, the Day-Off selector counter disables the address counter circuits 40 and eliminates any operation of the device during Saturday and Sunday.

Therefore on Saturday and Sunday, the alarm output 43 and the relay remain de-energized so that its contacts remain in the position as shown in FIGS. 2 and 3 regardless of the time set on the memory circuit. Therefore, the thermoswitch circuit only operates on the low range temperature selector 49 which turns ON the heating system when the temperature in the building goes down to below 10° C. and turns OFF the heating system when the temperature reaches 12° C. (due to the hysteresis effect by the feedback current from 58 through D1, R2 and S1 to the input of 55) in the building until 07.35 hours Monday morning at which time the electronic timer and the thermoswitch repeat the operation as programmed.

If the operator wishes to turn ON and turn OFF the lighting system or other appliances in the building at the same time as the thermoswitch operates the heating system, this is accomplished simply by connecting the lighting system or the applicance wiring to the relay contacts 66, 67 and 68 in the output circuit 43 of the electronic timer.

If the operator wishes to program the above example time setting manually and also wants to display the program data entered into the unit, on the display units, he first switches the time display switch S10 to OTHER position 33 and the load/start switch S3 to LOAD position. The address advance switch S5 is then moved to the manual position. To program the time setting 07351720 and 20212258 into the memory circuits, the time setting keyboard switch 0 is actuated followed by the actuation of the SPST center off momentary operated manual address advance switch S6, then 7 is actuated followed by the switch S6 and so on until the entire sequence has been entered, punching the manual address advance switch S6 each time after the time setting keyboard switch has been pressed so that the data entered displays as follows:

|  | 1st time setting sequence | | | | | | | |
| --- | --- | --- | --- | --- | --- | --- | --- | --- |
|  | ON Time | | | | OFF Time | | | |
| Time Setting | 0 | 7 | 3 | 5 | 1 | 7 | 2 | 0 |
| Memory Location | 00 | 01 | 02 | 03 | 04 | 05 | 06 | 07 |
|  | 2nd time setting sequence | | | | | | | |
|  | ON Time | | | | OFF Time | | | |
| Time Setting | 2 | 0 | 2 | 1 | 2 | 2 | 5 | 8 |
| Memory Location | 08 | 09 | 10 | 11 | 12 | 13 | 14 | 15 |

When the last data has been entered, the operator punches the time setting switch 36 and the first digit 28 of the display unit displays the memory location 1, the second digit 29 displays the numeral 5, the third digit 30 displays the numeral 8 and the day location starting with 001 (Monday), so that 1 (Monday) will be displayed by the fourth digit 31.

After the last number has been punched then the manual advance switch S6 is actuated and the END DATA switch S1 is actuated thus completing the time setting program manually.

Referring back to the description of the method of correcting entries when in the manual mode, and assuming that in entering the 2nd time setting sequence, the operator incorrectly actuated the time setting switch #8 instead of #2 in memory location 08, the operator would proceed as follows in order to correct the error. The fast advance switch S6 is CLOSED which advances the memory location whereupon it starts 09, 10, 11, 12 to the last memory location then repeats 00, 01, 02, etc., until it reaches 08 whereupon the operator releases the fast advance switch S6 and then re-enters the correct data which in this example would be by actuating time setting switch #2 followed by #0, 2, 1, 2, 2, 5, 8 thus completing the program.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A device for controlling electrical equipment comprising in combination an electronic clock, a time display device operatively connected to said electronic clock, a time setting keyboard for producing pulses, a memory unit, means operatively connecting said memory unit to said time setting keyboard for injecting ON times and duration times within said memory unit, said means including means to translate said pulses into binary coded decimal format, an address selector counter operatively connected to said keyboard, means whereby each pulse from said keyboard operates said address selector counter, said address selector counter being operatively connected to said memory unit, a comparator module operatively connected to said memory unit and to said address selector counter and an alarm duration counter operatively connected to said comparator module, an alarm output module operatively connected to said alarm duration counter, and a plurality of relay controlled output circuits operatively connected to said alarm output module, said comparator module operating said alarm output module and energizing said relay controlled output circuits when the time entered in said memory unit coincides with the time displayed on said time display device thereby operating said relays.

2. The device according to claim 1 in which said an alarm duration counter is operatively connected to said comparator module and to said alarm output module for de-energizing said alarm output module and hence said relays when duration time in said memory unit coincides with the time on said display device.

3. The device according to claim 1 which includes a Day-Off selector keyboard for selecting days upon which said alarm output is energized and a Day-Off selector counter operatively connected to said clock and between said Day-Off selector keyboard and said memory unit.

4. The device according to claim 2 which includes a Day-Off selector keyboard for selecting days upon which said alarm output is energized and a Day-Off selector counter operatively connected to said clock and between said Day-Off selector keyboard and said memory unit.

5. The device according to claim 1 which includes circuit means to call up information from said memory circuit and to display same on said time display device.

6. The device according to claim 2 which includes circuit means to call up information from said memory circuit and to display same on said time display device.

7. The device according to claim 3 which includes circuit means to call up information from said memory circuit and to display same on said time display device.

8. The device according to claim 4 which includes circuit means to call up information from said memory circuit and to display same on said time display device.

9. The device according to claim 1 which includes two-position selector switch means operatively connected between said time setting keyboard and said address selector counter for advancing said counter automatically upon actuation of said time selector keyboard when said switch means is in one position and further switch means to manually advance said address selector counter when said selector switch is in another position.

10. The device according to claim 1 which includes a thermoswitch assembly operatively connected to one of said relay controlled output circuits of said alarm output module, said thermoswitch assembly including a low range temperature selector and a high range temperature selector, a temperature sensor and a comparator operatively connected together, and an output relay means operatively connected to said comparator, the associated electrical equipment being operatively connected to said output relay means.

11. The device according to claim 10 which includes an hysteresis circuit operatively connected between said output relay means and said comparator for controlling the range through which the variation of ambient temperature passes before energizing and de-energizing said relay means.

* * * * *